US012487293B2

(12) United States Patent
Nishimura et al.

(10) Patent No.: US 12,487,293 B2
(45) Date of Patent: Dec. 2, 2025

(54) SHORT CIRCUIT DETECTION DEVICE AND SHORT CIRCUIT DETECTION METHOD

(71) Applicant: HIOKI E.E. CORPORATION, Nagano (JP)

(72) Inventors: Kota Nishimura, Nagano (JP); Junji Iijima, Nagano (JP)

(73) Assignee: HIOKI E.E. CORPORATION, Nagano (JP)

( * ) Notice: Subject to any disclaimer, the term of this patent is extended or adjusted under 35 U.S.C. 154(b) by 138 days.

(21) Appl. No.: 18/568,074

(22) PCT Filed: Jun. 14, 2022

(86) PCT No.: PCT/JP2022/023859
§ 371 (c)(1),
(2) Date: Dec. 7, 2023

(87) PCT Pub. No.: WO2022/265026
PCT Pub. Date: Dec. 22, 2022

(65) Prior Publication Data
US 2024/0272239 A1 Aug. 15, 2024

(30) Foreign Application Priority Data

Jun. 14, 2021 (JP) .................................. 2021-098695
Jun. 13, 2022 (JP) .................................. 2022-095297

(51) Int. Cl.
*G01R 31/52* (2020.01)
*G01R 15/16* (2006.01)
*G01R 19/165* (2006.01)

(52) U.S. Cl.
CPC ........... *G01R 31/52* (2020.01); *G01R 15/165* (2013.01); *G01R 19/16571* (2013.01)

(58) Field of Classification Search
CPC ................. G01R 31/52; G01R 15/165; G01R 19/16571; G01R 31/3865; G01R 31/389; G01R 31/50; H01G 13/00; H01M 10/48; Y02E 60/10
USPC ....................................... 324/557, 555, 500
See application file for complete search history.

(56) References Cited

U.S. PATENT DOCUMENTS

| | | | |
|---|---|---|---|
| 10,838,013 B2* | 11/2020 | Tenmyo | H01M 10/482 |
| 11,169,212 B2* | 11/2021 | Hsiao | G01R 31/386 |
| 2015/0102817 A1* | 4/2015 | Angerbauer | H01M 6/5083 |
| | | | 324/426 |
| 2019/0245252 A1* | 8/2019 | Mäki | H01M 10/482 |

(Continued)

FOREIGN PATENT DOCUMENTS

| | | |
|---|---|---|
| JP | 2004-215398 A | 7/2004 |
| JP | 2020-071054 A | 5/2020 |

(Continued)

*Primary Examiner* — Giovanni Astacio-Oquendo
(74) *Attorney, Agent, or Firm* — Conley Rose, P.C

(57) ABSTRACT

A short circuit detection device for detecting a short circuit occurring in a detection target measures an electrostatic capacitance value of the detection target and determines, on the basis of the measured electrostatic capacitance value, a current value of a current to be supplied to the detection target. Furthermore, the short circuit detection device supplies the current having the determined current value to the detection target and detects a short circuit in the detection target while the current is being supplied to the detection target.

7 Claims, 3 Drawing Sheets

(56) References Cited

U.S. PATENT DOCUMENTS

| | | | |
|---|---|---|---|
| 2020/0011916 A1* | 1/2020 | Park | ................. H01M 10/4285 |
| 2020/0025832 A1 | 1/2020 | Cho et al. | |
| 2024/0241188 A1* | 7/2024 | Na | .................... H01M 10/4285 |

FOREIGN PATENT DOCUMENTS

| | | |
|---|---|---|
| WO | 2012/117448 A1 | 9/2012 |
| WO | 2014/061238 A1 | 4/2014 |

* cited by examiner

SHORT CIRCUIT DETECTION DEVICE AND SHORT CIRCUIT DETECTION METHOD

TECHNICAL FIELD

The present invention relates to a short circuit detection device and a short circuit detection method.

BACKGROUND ART

JP 2020-71054 A discloses a micro-short circuit detection device that detects a micro-short circuit by measuring a voltage between two ends of a detection target while a constant current is being supplied to a lithium secondary battery.

SUMMARY OF INVENTION

An inspection device such as described above supplies a current to a detection target such as a lithium secondary battery. However, a current value of the current to be supplied to the detection target needs to be set for each detection target, on the basis of a rated current value of the detection target or the like.

The present invention has been contrived in view of the problems mentioned above, and an object thereof is to provide a short circuit detection device and a short circuit detection method capable of detecting a short circuit occurring in a detection target, without setting, for each detection target, a current value of a current to be supplied to the detection target.

According to an aspect of the present invention, a short circuit detection device for detecting a short circuit occurring in a detection target includes a capacitance measurement circuit configured to measure an electrostatic capacitance value of the detection target, and a current determinator configured to determine a current value of a current to be supplied to the detection target, on the basis of the electrostatic capacitance value measured by the capacitance measurement circuit. The short circuit detection device further includes a current supply circuit configured to supply the current having the current value determined by the current determinator to the detection target, and a detection circuit configured to detect a short circuit in the detection target while the current is being supplied to the detection target by the current supply circuit.

According to this aspect, by measuring the electrostatic capacitance value of the detection target before supplying the current to the detection target, the current value of the current to be supplied to the detection target can be determined, on the basis of the electrostatic capacitance value. Therefore, it is possible to detect a short circuit without setting, for each detection target, the current value of the current to be supplied to the detection target.

DESCRIPTION OF EMBODIMENTS

Embodiments of the present invention will be described below with reference to the accompanying drawings.

First Embodiment

Figure 1:
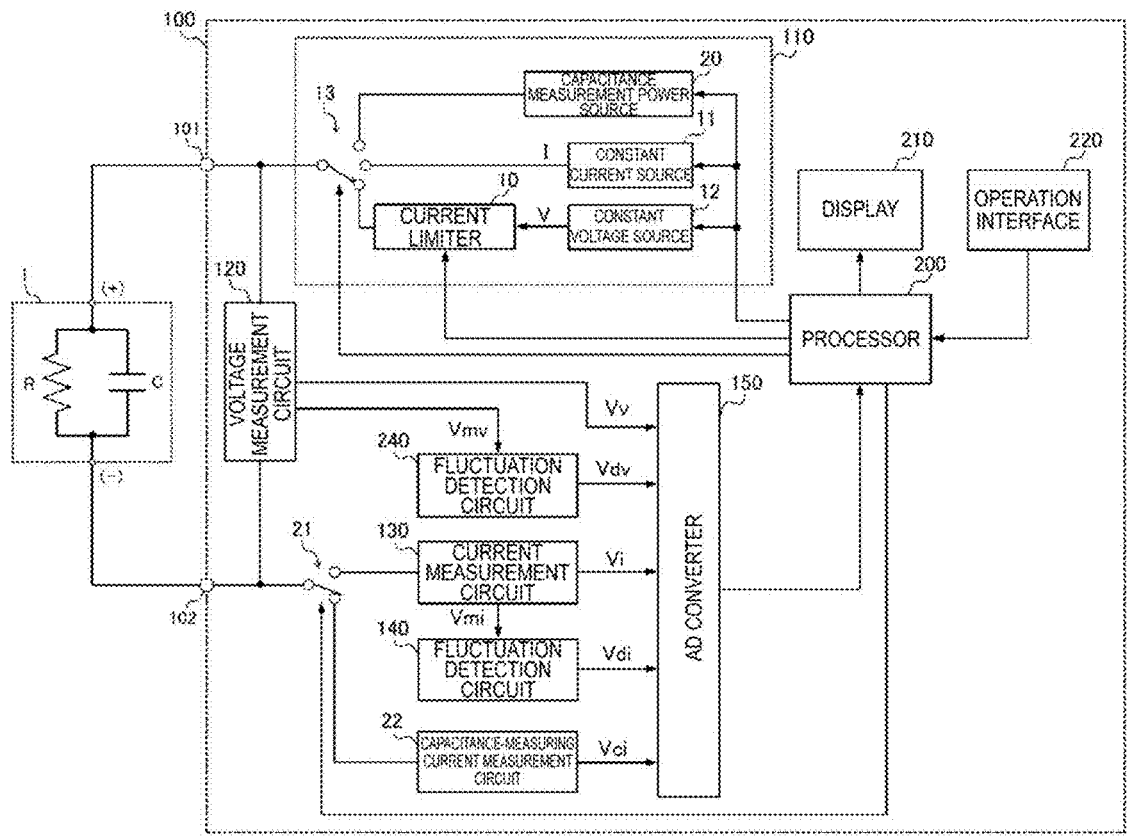
FIG. 1 is a block diagram illustrating a functional configuration of a short circuit detection device according to a first embodiment of the present invention.

FIG. 1 is a block diagram illustrating a functional configuration of a short circuit detection device 100 according to a first embodiment.

The short circuit detection device 100 detects a short circuit occurring in a detection target 1. Here, the term "short circuit" includes not only a steady short circuit but also a short-time short circuit such as short-time insulation failure and insulation deterioration caused by an abnormal situation occurring in the detection target 1.

Examples of factors causing a short-time short circuit include anomalies such as a foreign metal substance being present in an electrode constituting a battery, occurrence of contamination, burr between an electrode of a battery and an exterior casing of the battery, cracks in a laminated ceramic capacitor, and micro-short circuits between substrate patterns. As described above, the short circuit detection device 100 detects a short circuit caused by the above-mentioned anomaly occurring in the detection target 1. For example, the short circuit detection device 100 is used to measure or examine the detection target 1 in which a DC electric signal is supplied (applied) to the detection target 1.

The short circuit detection device 100 according to the first embodiment supplies a DC voltage to the detection target 1 to measure an insulation resistance value R of the detection target 1, on the basis of the magnitude of a leakage current output from a negative electrode (−) of the detection target 1.

The detection target 1 is an object having at least capacitance of an electrostatic capacitance value C and, in a state in which a DC electric signal is supplied to the object, a voltage signal generated in the object or a current signal flowing through the object temporarily fluctuates when an anomaly occurs in the object.

Hereinafter, a state where the level of the electric signal increases from a standard level and then decreases is referred to as a "temporary increase", and a state where the level of the electric signal decreases from the standard level and then increases is referred to as a "temporary decrease". These temporary fluctuations are also simply referred to as "fluctuations".

An example of the detection target 1 is a secondary battery. The secondary battery is a chargeable and dischargeable storage battery, and is a power storage device including a capacitor-type power storage element such as an electric double-layer capacitor. The secondary battery may be a unit cell or may be a battery pack in which a plurality of unit cells are connected in parallel, in series, or in series-parallel.

Examples of the secondary battery include a lead storage battery, a nickel-hydrogen battery, a nickel-cadmium battery, a lithium metal battery, a lithium ion battery, a lithium ion polymer battery, an all-solid-state lithium ion battery, and a sodium ion battery. In addition, an aqueous solution-type electric double-layer capacitor or a drainage solution-type electric double-layer capacitor can also be used as the secondary battery.

The detection target 1 in the first embodiment is a lithium ion battery before liquid injection. The lithium ion battery has the insulation resistance value R and the electrostatic capacitance value C, and is represented by an equivalent circuit in which the insulation resistance value R and the electrostatic capacitance value C are connected in parallel to each other.

In the first embodiment, a positive electrode (+) of the detection target 1 is connected to a connection terminal 101 of the short circuit detection device 100, and the negative electrode (−) of the detection target 1 is connected to a connection terminal 102 of the short circuit detection device 100.

The short circuit detection device 100 includes a current limiter 10, a constant current source 11, a constant voltage source 12, a switch 13, a capacitance measurement power source 20, a switch 21, a capacitance-measuring current measurement circuit 22, a voltage measurement circuit 120, a current measurement circuit 130, a fluctuation detection circuit 140, and an AD converter 150. The short circuit detection device 100 further includes a processor 200, a display 210, an operation interface 220, and a fluctuation detection circuit 240.

The current limiter 10 is connected to an output terminal of the constant voltage source 12. The current limiter 10 limits a current supplied from the constant voltage source 12 to the detection target 1, in accordance with an instruction from the processor 200.

The constant current source 11 constitutes a constant current supply circuit that supplies, to the detection target 1, a current I that is controlled such that a predetermined current value is maintained. Hereinafter, the predetermined current value is denoted by I1. The constant current source 11 charges the detection target 1 by supplying a constant direct current to the positive electrode (+) of the detection target 1 via the connection terminal 101 of the short circuit detection device 100.

The constant voltage source 12 constitutes a constant voltage supply circuit that supplies, to the detection target 1, a voltage V that is controlled such that a predetermined voltage value is maintained. Hereinafter, the predetermined voltage value is denoted by V1. The constant voltage source 12 supplies a constant DC voltage between the positive electrode and the negative electrode of the detection target 1 via the connection terminal 101 to detect a leakage current of the detection target 1.

The switch 13 switches the power source connectable to the detection target 1 between the capacitance measurement power source 20, the constant current source 11, and the constant voltage source 12. The switch 13 connects the positive electrode (+) of the detection target 1 and the capacitance measurement power source 20 in accordance with a command from the processor 200 and, when measurement of the electrostatic capacitance value of the detection target 1 is complete, switches the power source connected to the detection target 1 from the capacitance measurement power source 20 to the constant current source 11 or the constant voltage source 12.

The capacitance measurement power source 20 constitutes a voltage supply circuit that supplies a capacitance measurement voltage to the detection target 1. The capacitance measurement power source 20 charges and discharges the detection target 1 by supplying an AC voltage as the capacitance measurement voltage to the positive electrode (+) of the detection target 1 via the connection terminal 101 of the short circuit detection device 100. The capacitance measurement voltage is an AC voltage having a plurality of frequency components.

The switch 21 switches the current measurement circuit connected to the detection target 1 between the current measurement circuit 130 and the capacitance-measuring current measurement circuit 22. The switch 21 connects the negative electrode (−) of the detection target 1 and the capacitance-measuring current measurement circuit 22 in accordance with a command of the processor 200 and, when measurement of the electrostatic capacitance value C of the detection target 1 is complete, switches the capacitance-measuring current measurement circuit 22 connected to the detection target 1 to the current measurement circuit 130.

The capacitance-measuring current measurement circuit 22 executes a current measurement process for measuring the electrostatic capacitance value C of the detection target 1 in accordance with a capacitance measurement command from the processor 200.

The capacitance-measuring current measurement circuit 22 measures an alternating current of the detection target 1 on the basis of a response signal generated in the detection target 1 while an AC signal is being supplied between the positive electrode (+) and the negative electrode (−) of the detection target 1. The capacitance-measuring current measurement circuit 22 outputs, to the AD converter 150, a voltage signal indicating the magnitude of the measured alternating current, as a current detection signal Vci.

The current measurement circuit 130 constitutes measurement circuit that measures the magnitude of the current generated in the detection target 1. The current measurement circuit 130) acquires a current detection signal Vi indicating a current value of the detection target 1.

The current measurement circuit 130 according to the first embodiment measures the magnitude of the leakage current output from the negative electrode (−) of the detection target 1. Subsequently, the current measurement circuit 130 outputs, to the AD converter 150, a voltage signal indicating the magnitude of the measured current, as the current detection signal Vi.

For example, in a state where the detection target 1 is being charged by the constant current source 11, the magnitude of the leakage current is at the milliampere (mA) level. On the other hand, in a state where the voltage of the detection target 1 is maintained at the voltage value V1 by the constant voltage source 12, the magnitude of the leakage current is at the nanoampere (nA) or microampere (uA) level.

For example, the current measurement circuit 130 is constituted by an IV conversion circuit that converts an input current into a voltage. The current measurement circuit 130 generates a measurement signal Vmi indicating the magnitude of the current output from the negative electrode (−) of the detection target 1, and outputs the generated measurement signal Vmi to the fluctuation detection circuit 140.

The fluctuation detection circuit 140 detects a fluctuation of the measurement signal Vmi caused by a short circuit occurring in the detection target 1. The fluctuation detection circuit 140 according to the first embodiment detects a temporary fluctuation of the measurement signal Vmi caused by a short circuit occurring when a foreign substance enters the detection target 1.

For example, the fluctuation detection circuit 140 is constituted by a comparator circuit. The fluctuation detection circuit 140 outputs a fluctuation detection signal Vdi indicating the detected fluctuation to the AD converter 150.

The fluctuation detection circuit 240 detects a fluctuation of a measurement signal Vmv caused by a short circuit occurring in the detection target 1. The fluctuation detection circuit 240) according to the first embodiment detects a temporary fluctuation of the measurement signal Vmv caused by a short circuit occurring when a foreign substance enters the detection target 1.

The fluctuation detection circuit 240 has a configuration identical or equivalent to that of the fluctuation detection circuit 140. For example, the fluctuation detection circuit 240) is constituted by a comparator circuit. The fluctuation detection circuit 240 outputs a fluctuation detection signal Vdv indicating the detected fluctuation to the AD converter 150.

The AD converter 150 samples the current detection signal Vci from the capacitance-measuring current measurement circuit 22 at a predetermined period, and outputs data generated by the sampling to the processor 200.

Similarly, the AD converter 150 samples the current detection signal Vi from the current measurement circuit 130, the fluctuation detection signal Vdi from the fluctuation detection circuit 140, a voltage detection signal Vv from the voltage measurement circuit 120, and the fluctuation detection signal Vdv from the fluctuation detection circuit 240 at a predetermined period. Subsequently, the AD converter 150 outputs each piece of data generated by the sampling to the processor 200.

The processor 200 is a computer including a processor, a read only memory (ROM), a random access memory (RAM), a mass storage device, an input/output interface, and a bus connecting these components to each other. Examples of the processor include a central processor (CPU) and a micro processor unit (MPU). Examples of the mass storage device include a hard disk drive (HDD) and a solid state drive (SSD).

The processor 200 controls the current limiter 10, the constant current source 11, and the constant voltage source 12, which constitute a power source 110, and controls the switch 13, the capacitance measurement power source 20, and the switch 21.

The processor 200 executes a short circuit detection process for detecting a short circuit occurring in the detection target 1. For example, upon receiving, from the operation interface 220, a request signal requesting execution of the short circuit detection process, the processor 200 executes the short circuit detection process.

In the above-described short circuit detection process, first, the processor 200 controls the connection of the switch 13 so as to connect the capacitance measurement power source 20 to the positive electrode (+) of the detection target 1. Subsequently, the processor 200 controls the capacitance measurement power source 20 to supply an AC voltage having a plurality of frequency components to the detection target 1.

The processor 200 controls the switch 21 to connect the capacitance-measuring current measurement circuit 22 to the negative electrode (−) of the detection target 1. Subsequently, the processor 200 controls the capacitance-measuring current measurement circuit 22 to measure the current value of the current flowing through the detection target 1 by the AC voltage supplied by the capacitance measurement power source 20.

The processor 200 acquires the current detection signal Vci indicating a current value of the detection target 1 from the capacitance-measuring current measurement circuit 22 via the AD converter 150. Subsequently, the processor 200 measures the electrostatic capacitance value C of the detection target 1 on the basis of the current detection signal Vci. As described above, the processor 200 measures the electrostatic capacitance value C by using an AC impedance measurement method.

After measuring the electrostatic capacitance value C, the processor 200 uses the measured electrostatic capacitance value C of the detection target 1 to determine the current value I1 of the current I output from the constant current source 11. That is, the processor 200 constitutes current determinator that determines, on the basis of the measured electrostatic capacitance value C, the current value I1 of the current I to be supplied to the detection target 1.

While the current I having the current value I1 is being supplied to a capacitor having the electrostatic capacitance value C in the detection target 1, a voltage Vf between the two ends of the capacitor at which the capacitor is fully charged is represented by the current value I1, the electrostatic capacitance value C, and a charging time Tc required for complete charging, as illustrated in Equation (1) below.

$$Vf = I1 * Tc/C \qquad (1)$$

For example, if the current value I1 of the current I supplied to the detection target 1 is a fixed value, regardless of the detection target 1, the charging time Tc varies depending on the difference in the electrostatic capacitance value C of each detection target 1. Depending on the electrostatic capacitance value C, the current value I1 may need to be reduced so as not to damage the detection target 1. Therefore, it is necessary to set the current value I1 for each detection target 1 in accordance with the electric characteristics of the detection target 1.

As a countermeasure, the processor 200 according to the first embodiment determines the current value I1 of the current I on the basis of the measured electrostatic capacitance value C of the detection target 1.

Next, the processor 200 controls operations of the constant current source 11 and the constant voltage source 12 on the basis of the voltage detection signal Vv and the current detection signal Vi.

Specifically, after determining the current value I1 of the current I supplied to the detection target 1, the processor 200 acquires the voltage detection signal Vv indicating the voltage value of the detection target 1 via the AD converter 150.

Subsequently, the processor 200 controls the connection of the switch 13 to connect the constant current source 11 to the positive electrode (+) of the detection target 1. Then, the processor 200 controls the constant current source 11 on the basis of the current detection signal Vi such that the current value I1 of the current I used by the constant current source 11 to charge the detection target 1 is maintained at a constant value.

At this time, the processor 200 determines, on the basis of the voltage detection signal Vv, whether the voltage generated between the positive electrode (+) and the negative electrode (−) of the detection target 1 reaches the predetermined voltage value V1.

In a case where the voltage of the detection target 1 reaches the voltage value V1, the processor 200 controls the connection of the switch 13 to switch the power source connected to the detection target 1 from the constant current source 11 to the constant voltage source 12. Subsequently, the processor 200 controls the constant voltage source 12 on the basis of the voltage detection signal Vv, such that the voltage value V1 of the voltage generated between the two electrodes of the detection target 1 is maintained at a constant value. That is, the processor 200 according to the first embodiment uses the constant voltage source 12 to perform constant voltage control.

As described above, upon receiving the request signal mentioned above, the processor 200 controls an operation of the power source 110, such that the detection target 1 is charged with the current I maintained at the current value I1 and the voltage value V1 is continuously supplied to the detection target 1.

While power is being supplied from the power source 110 to the detection target 1, the processor 200 acquires the fluctuation detection signal Vdi or the fluctuation detection signal Vdv via the AD converter 150. Subsequently, the processor 200 determines, on the basis of the fluctuation detection signal Vdi or the fluctuation detection signal Vdv, whether a short circuit has occurred due to an abnormal situation that may occur in the detection target 1.

The processor 200 calculates a physical quantity of the detection target 1 on the basis of the current detection signal Vi and the voltage detection signal Vv acquired via the AD converter 150. Examples of the physical quantity of the detection target 1 include a leakage current value of the detection target 1 and the insulation resistance value R of the detection target 1. The processor 200 outputs, to the display 210, a determination result or a calculation result indicating whether there is a short circuit.

The display 210 generates image data expressing the determination result or the calculation result output from the processor 200 and displays the image data. For example, the display 210 is constituted by an LED display, a liquid crystal panel, or a touch panel.

The operation interface 220 receives an input operation by a user and outputs an operation signal indicating the received input operation to the processor 200. For example, the operation interface 220 is constituted by a push button provided in the vicinity of a screen of the display 210, a touch sensor incorporated in a touch panel, or a keyboard and a mouse.

For example, the operation interface 220 receives a user operation in which the user depresses a button for executing the short circuit detection process, and in response to reception of the user operation, outputs the above-described short circuit detection request to the processor 200. Thus, the short circuit detection process is executed in the short circuit detection device 100.

Next, an operation of the short circuit detection device 100 according to the first embodiment will be described.

First, in the short circuit detection device 100, for example, when a user uses the operation interface 220 to perform an input operation, the operation interface 220 outputs an operation signal to the processor 200. Subsequently, when the processor 200 recognizes that the operation signal is a request signal for the short circuit detection process, the processor 200 starts the short circuit detection process.

First, the processor 200 measures the electrostatic capacitance value C of the detection target 1.

Specifically, the processor 200 switches the switch 13 to connect the capacitance measurement power source 20 to the positive electrode (+) of the detection target 1, and switches the switch 21 to connect the capacitance-measuring current measurement circuit 22 to the negative electrode (−) of the detection target 1. Subsequently, the processor 200 controls the capacitance measurement power source 20 to supply a capacitance measurement voltage to the detection target 1.

In this state, the capacitance-measuring current measurement circuit 22 measures an alternating current flowing through the detection target 1 and outputs, to the AD converter 150, the current detection signal Vci indicating the magnitude of the alternating current flowing through the detection target 1. The AD converter 150 outputs data indicating the magnitude of the current detection signal Vci to the processor 200. The processor 200 calculates the electrostatic capacitance value C of the detection target 1 on the basis of the current detection signal Vci.

Subsequently, on the basis of the calculated electrostatic capacitance value C, the processor 200 determines the current value I1 of the current I to be supplied to the detection target 1. In a specific example, the processor 200 uses the electrostatic capacitance value C of the detection target 1 to calculate the current value I1 of the current I to be supplied. For example, a value obtained by calculating k·C is used as the current value I1, where k is an appropriately determined coefficient. In another example, a value obtained by calculating Va·C/Tc is used as the current value I1, where Va is the voltage when the detection target 1 is fully charged and Tc is the charging time. Subsequently, on the basis of the determined current value I1, the processor 200 supplies, to the detection target 1, the current I indicating the current value I1.

Then, the processor 200 switches the switch 13 to connect the positive electrode (+) of the detection target 1 and the constant current source 11, and switches the switch 21 to connect the negative electrode (−) of the detection target 1 and the current measurement circuit 130. The processor 200 controls the constant current source 11 such that the current I having the current value I1 flows through the detection target 1.

In a state where the constant current source 11 supplies the current I having the current value I1, the processor 200 detects a short circuit in the detection target 1.

Specifically, the current measurement circuit 130 outputs, to the fluctuation detection circuit 140, the measurement signal Vmi indicating the magnitude of the current flowing through the detection target 1. On the basis of the measurement signal Vmi, the fluctuation detection circuit 140 outputs, to the AD converter 150, the fluctuation detection signal Vdi indicating whether a short circuit is occurring in the detection target 1. The AD converter 150 outputs data obtained by sampling the fluctuation detection signal Vdi to the processor 200. The processor 200 detects a short circuit occurring in the detection target 1 from the data indicating the fluctuation detection signal Vdi.

Note that, in the first embodiment, the processor 200 detects the short circuit in the detection target 1 by using the fluctuation detection signal Vdi of the fluctuation detection circuit 140. However, the processor 200 may detect the short circuit in the detection target 1 by using the fluctuation detection signal Vdv of the fluctuation detection circuit 240.

Next, a short circuit detection method according to the first embodiment will be described with reference to FIG. 2.

Figure 2:
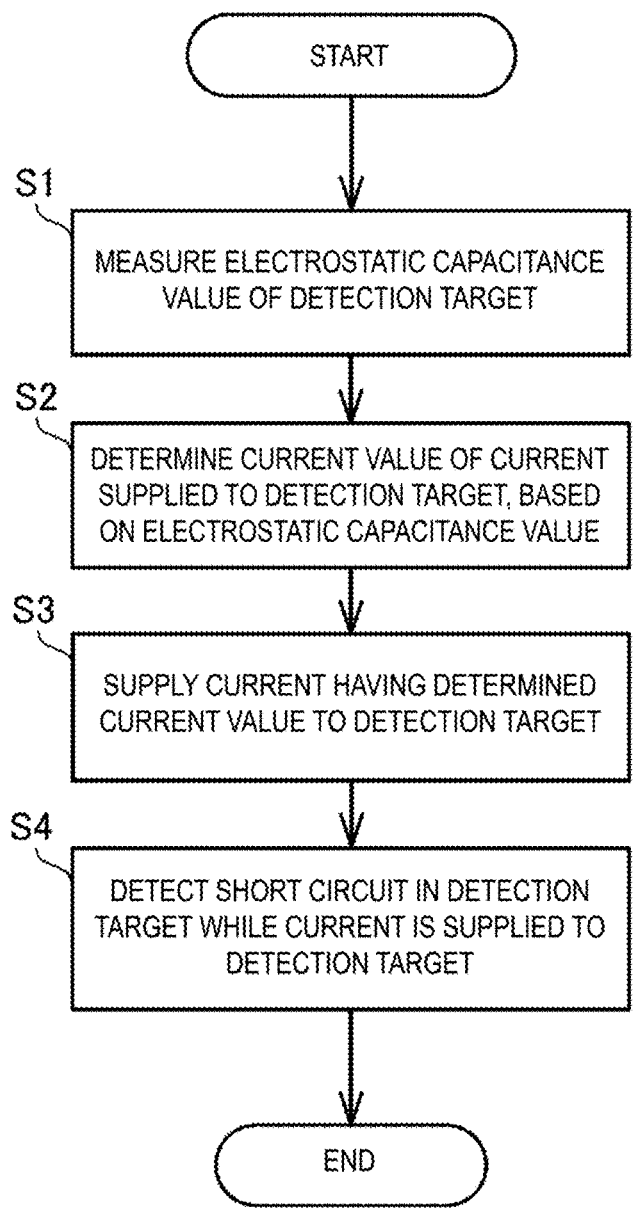
FIG. 2 is a flowchart illustrating a processing procedure of a short circuit detection method according to the first embodiment.

FIG. 2 is a flowchart illustrating an example of a short circuit detection method performed by the short circuit detection device 100.

First, in the short circuit detection device 100, for example, when a user uses the operation interface 220 to perform an input operation, the operation interface 220 outputs an operation signal to the processor 200. When the processor 200 recognizes that the operation signal requests short circuit detection, the processor 200 starts short circuit detection.

In step S1, the processor 200 measures the electrostatic capacitance value C of the detection target 1.

In step S2, the processor 200 determines the current value I1 of the current I to be supplied to the detection target 1 on the basis of the electrostatic capacitance value C of the detection target 1. The processor 200 uses the electrostatic capacitance value C obtained in step S1 to calculate the current value I1 of the current I.

In step S3, the processor 200 supplies, to the detection target 1, the determined current I having the current value I1.

Specifically, the processor 200 switches the switch 13 to connect the constant current source 11 to the positive electrode (+) of the detection target 1, and switches the switch 21 to connect the capacitance-measuring current measurement circuit 22 to the negative electrode (−) of the detection target 1. The processor 200 controls the constant current source 11 such that the current I having the current value I1 obtained in step S2 flows through the detection target 1.

In step S4, the processor 200 detects a short circuit in the detection target 1 while the current I whose current value I1 is maintained constant is being supplied to the detection target 1.

Next, operation and effects of the first embodiment will be described.

The short circuit detection device 100 according to the first embodiment includes the capacitance measurement power source 20 and the capacitance-measuring current measurement circuit 22 (capacitance measurement circuit) that measure the electrostatic capacitance value C of the detection target 1, and the processor 200 (current determinator) that determines the current value I1 of the current I to be supplied to the detection target 1. The short circuit detection device 100 further includes the constant current source 11 (current supply circuit) that supplies the current I to the detection target 1, and the current measurement circuit 130 and the fluctuation detection circuit 140 (detection circuit) that detect a short circuit in the detection target 1.

The capacitance measurement power source 20 and the capacitance-measuring current measurement circuit 22 measure the electrostatic capacitance value C of the detection target 1. The processor 200 (current determinator) determines the current value I1 of the current I to be supplied to the detection target 1, on the basis of the electrostatic capacitance value C measured by the capacitance measurement power source 20 and the capacitance-measuring current measurement circuit 22 (capacitance measurement circuit).

The constant current source 11 supplies the current I having the current value I1 determined by the processor 200 (current determinator) to the detection target 1. While the current I having the current value I1 is being supplied to the detection target 1 by the constant current source 11, the current measurement circuit 130 and the fluctuation detection circuit 140) (detection circuit) detect a short circuit in the detection target 1.

According to this configuration, before supplying the current I to the detection target 1, the short circuit detection device 100 can determine the current value I1 of the current I, on the basis of the electrostatic capacitance value C, by measuring the electrostatic capacitance value C of the detection target 1. Thus, a short circuit occurring in the detection target 1 can be detected without setting the current value I1 of the current I to be supplied to the detection target 1 for each detection target 1.

Below, modifications of the short circuit detection device 100 according to the first embodiment will be described. These modifications are partial modifications of the first embodiment, and thus, description of components that are the same as those in the first embodiment will be omitted.

First Modification

Figure 3:
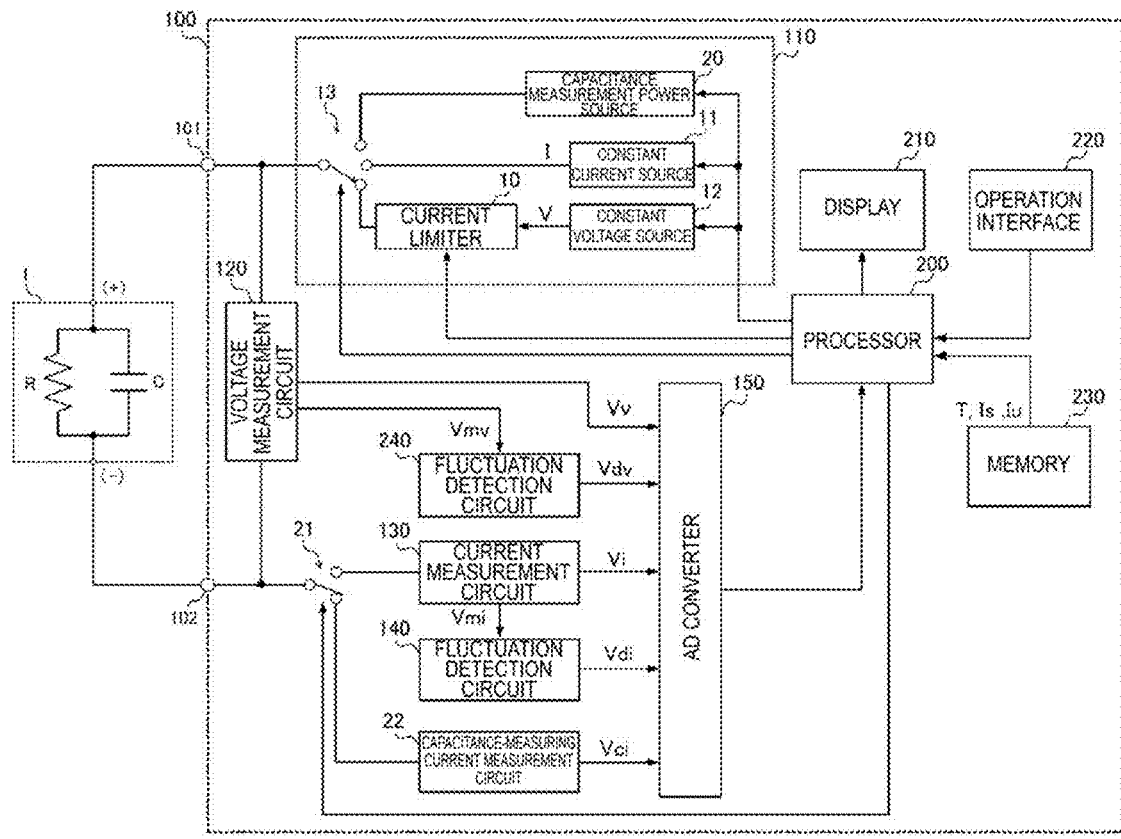
FIG. 3 is a block diagram illustrating a modification of the short circuit detection device according to the first embodiment.

FIG. 3 is a block diagram illustrating a modification of a configuration of the short circuit detection device 100 according to the first embodiment.

In addition to the configuration of the short circuit detection device 100 illustrated in FIG. 1, the short circuit detection device 100 according to a first modification includes a memory 230.

The memory 230 constitutes a memory in which a detection time T is stored in advance before the processor 200 determines the current value I1. The detection time T is a time during which the processor 200 detects a short circuit in the detection target 1.

In a specific example, when the user uses the operation interface 220 to perform an input operation, the operation interface 220 outputs, to the processor 200, an operation signal corresponding to the input operation. Subsequently, the processor 200 determines whether the operation signal is a setting signal indicating the detection time T. In a case where the operation signal is determined to be the setting signal, the processor 200 stores the detection time T indicated by the setting signal in the memory 230. The detection time T is set to 5 milliseconds, for example.

Subsequently, when the electrostatic capacitance value C of the detection target 1 is measured by the capacitance measurement power source 20 and the capacitance-measuring current measurement circuit 22, the processor 200 determines the current value I1 of the current I on the basis of the electrostatic capacitance value C and the detection time T stored in the memory 230.

Next, operation and effects of the first modification will be described.

In addition to the configuration of the short circuit detection device 100 illustrated in FIG. 1, the short circuit detection device 100 according to the first modification includes the memory 230. The memory 230 stores the detection time T, before the processor 200 (current determinator) determines the current value I1 of the current I to be supplied to the detection target 1.

The processor 200 (current determinator) determines the current value I1 of the current I on the basis of the detection time T stored in the memory 230 and the electrostatic capacitance value C measured by the capacitance measurement power source 20 and the capacitance-measuring current measurement circuit 22 (capacitance measurement circuit).

According to this configuration, the short circuit detection device 100 supplies the current I having the current value I1 to the detection target 1 in consideration of not only the electrostatic capacitance value C of the detection target 1 but also the detection time T set in advance. By determining the current value I1 in consideration of not only the electrostatic capacitance value C but also the detection time T, it is possible to supply the detection target 1 with the current I in an amount suitable for short circuit detection of the detection target 1 during the detection time T determined in advance. Therefore, it is possible to accurately detect a short circuit in the detection target 1 within a determined period of time.

Second Modification

As illustrated in FIG. 3, similarly to the first modification, in addition to the configuration of the short circuit detection device 100 illustrated in FIG. 1, the short circuit detection device 100 according to a second modification includes the memory 230.

The memory 230 constitutes a memory in which a set current value Is is stored in advance, before the processor 200 determines the current value I1 of the current I. The set current value Is is a current value of the current I determined in accordance with the electric characteristics of the detection target 1. The set current value Is in the second modification is set to a current value of the current I suitable for detecting a short circuit occurring in the detection target 1.

In a specific example, when the user uses the operation interface 220 to perform an input operation, the operation interface 220) outputs, to the processor 200, an operation signal corresponding to the input operation. Upon determining that the operation signal is a setting signal indicating the set current value Is, the processor 200 stores the set current value Is indicated by the setting signal in the memory 230.

Then, when the electrostatic capacitance value C of the detection target 1 is measured by the capacitance measurement power source 20 and the capacitance-measuring current measurement circuit 22, the processor 200 determines the current value I1 of the current I to be supplied to the detection target 1, on the basis of the electrostatic capacitance value C.

The processor 200 determines whether the set current value Is stored in the memory 230 is equal to or less than the determined current value I1. When the set current value Is is equal to or less than the current value I1, the processor 200 detects a short circuit in the detection target 1 while the current I having the set current value Is is being supplied to the detection target 1. On the other hand, when the set current value Is exceeds the current value I1, the processor 200 detects a short circuit in the detection target 1 while the current I having the determined current value I1 is being supplied to the detection target 1. Thus, it is possible to detect a short circuit in the detection target 1 in accordance with the electrostatic capacitance value C.

Next, operation and effects of the second modification will be described.

Similarly to the first modification, in addition to the configuration of the short circuit detection device 100 illustrated in FIG. 1, the short circuit detection device 100 according to the second modification includes the memory 230. The memory 230 stores the set current value Is set in advance, before the processor 200 (current determinator) determines the current value I1 of the current I to be supplied to the detection target 1.

Subsequently, the processor 200 (current determinator) determines the current value I1 of the current I to be supplied to the detection target 1, on the basis of the electrostatic capacitance value C measured by the capacitance measurement power source 20 and the capacitance-measuring current measurement circuit 22. When the set current value Is stored in the memory 230 is equal to or less than the determined current value I1, the processor 200 detects a short circuit in the detection target 1 while the current I having the set current value Is is being supplied to the detection target 1.

According to this configuration, when the current value I1 determined on the basis of the electrostatic capacitance value C is greater than the set current value Is, the current I having the set current value Is is supplied to the detection target 1.

As described above, by supplying, on the basis of the electrostatic capacitance value C, the current I that is a weak current equal to or less than the current value I1 to the detection target 1, it is possible to detect a short circuit in the detection target 1 by using the weak current I that matches the electric characteristics of the detection target 1 and by which the short circuit in the detection target 1 can be easily detected. Furthermore, it is possible to avoid supplying an excessive current to the detection target 1 and to suppress the consumption of power required in the short circuit detection process.

Third Modification

The short circuit detection device 100 according to a third modification has the same configuration as that illustrated in FIG. 3, but a specific function is added to the processor 200.

Specifically, the processor 200 increases the current value I1 of the current I supplied to the detection target 1 as the measured electrostatic capacitance value C of the detection target 1 increases, and decreases the current value I1 of the current I supplied to the detection target 1 as the electrostatic capacitance value C of the detection target 1 decreases.

In this process, as a comparison target for the magnitude of the electrostatic capacitance value C, an electrostatic capacitance value set in advance in the memory 230 of the short circuit detection device 100 may be used, or the electrostatic capacitance value C at the last time a short circuit was detected may be used.

A method of increasing or decreasing the current value I1 may include increasing or decreasing the magnitude of the set current value Is set in advance in the memory 230 of the short circuit detection device 100, or using the current value I1 determined on the basis of the detection time T or the electrostatic capacitance value C.

Next, operation and effects of the third modification will be described.

The processor 200 (current determinator) in the third modification increases the current value I1 of the current I supplied to the detection target 1 as the electrostatic capacitance value C increases, and decreases the current value I1 of the current I supplied to the detection target 1 as the electrostatic capacitance value C decreases.

According to this configuration, when the electrostatic capacitance value C of the capacitor constituting the detection target 1 is relatively large, the time required to charge the detection target 1 is long, and the short circuit detection device 100 supplies the current I having a large current value I1. On the other hand, when the electrostatic capacitance value C of the detection target 1 is small, the short circuit detection device 100 supplies the current I having a small current value I1.

Thus, even if the electrostatic capacitance values C of individual detection targets 1 differ from each other, the current value I1 is adjusted in accordance with the electrostatic capacitance value C, so that the detection times for detecting a short circuit in the detection target 1 are similar to each other.

Fourth Modification

The short circuit detection device 100 according to a fourth modification has the same configuration as that illustrated in FIG. 3, but a specific function is added to the processor 200. Specifically, the processor 200 controls the constant current source 11 such that a value obtained by dividing the electrostatic capacitance value C of the detection target 1 by the current value I1 of the current I supplied to the detection target 1 is constant.

For example, the processor 200 controls an operation of the constant current source 11 such that the current I having a value of 5 [mA] is supplied to the detection target 1 when an electrostatic capacitance value C1 is 10 [µF], and the current I having a value of 2.5 [mA] is supplied to the detection target 1 when an electrostatic capacitance value C2 is 5 [µF].

Next, operation and effects of the fourth modification will be described.

The processor 200 (current determinator) in the fourth modification controls the constant current source 11 (current supply circuit) such that a value obtained by dividing the electrostatic capacitance value C by the current value I1 of the current I supplied to the detection target 1 is constant.

In the detection target 1, when a current having the current value I1 is supplied to a capacitor having the electrostatic capacitance value C, the voltage V between the two ends of the capacitor after a time t in seconds is expressed by Equation (2) below. When this equation is rearranged to express the time t, Equation (3) below is obtained.

$$V = I1 * t/C \qquad (2)$$
$$t = V^*C/I1 \qquad (3)$$

Thus, the short circuit detection device 100 can adjust the current such that a value obtained by dividing the electrostatic capacitance value C of the detection target 1 by the current value I1 of the current supplied to the detection target 1 is constant. As a result, the short circuit detection device 100 can detect a short circuit at the same detection time even if the electrostatic capacitance values C of the detection targets 1 differ from each other.

Fifth Modification

As illustrated in FIG. 3, similarly to the above-described modifications, in addition to the configuration of the short circuit detection device 100 illustrated in FIG. 1, the short circuit detection device 100 according to a fifth modification includes the memory 230.

The memory 230 constitutes a memory that stores an upper limit current value Iu set in advance, before the processor 200 determines the current value I1 of the current I to be supplied to the detection target 1.

The upper limit current value Iu is a current value indicating an upper limit of the current I that can be supplied to the detection target 1. The upper limit current value Iu is determined in advance on the basis of the electric characteristics of the detection target 1, so as not to supply an excessive current to the detection target 1. For example, the upper limit current value Iu is set to several [A].

Subsequently, the electrostatic capacitance value C of the detection target 1 is measured by the capacitance measurement power source 20 and the capacitance-measuring current measurement circuit 22, and the processor 200 determines the current value I1 of the current I to be supplied to the detection target 1, on the basis of the measured electrostatic capacitance value C.

The processor 200 determines whether the upper limit current value Iu stored in the memory 230 is equal to or greater than the determined current value I1. When the upper limit current value Iu is equal to or greater than the current value I1, the processor 200 detects a short circuit in the detection target 1 while the current I having the determined current value I1 is being supplied to the detection target 1.

On the other hand, when the upper limit current value Iu is lower than the current value I1, the processor 200 detects a short circuit in the detection target 1 while the current I having the upper limit current value Iu is being supplied to the detection target 1.

Next, operation and effects of the fifth modification will be described.

In addition to the configuration of the short circuit detection device 100 illustrated in FIG. 1, the short circuit detection device 100 according to the fifth modification includes the memory 230. Before the processor 200 (current determinator) determines the current value I1 of the current I to be supplied to the detection target 1, the upper limit current value Iu indicating an upper limit of the current I on the basis of the electric characteristics of the detection target 1 is stored in advance in the memory 230.

The processor 200 (current determinator) determines the current value I1 of the current I to be supplied to the detection target 1, on the basis of the electrostatic capacitance value C measured by the capacitance measurement power source 20 and the capacitance-measuring current measurement circuit 22 (capacitance measurement circuit). When the upper limit current value Iu is equal to or greater than the determined current value I1, the processor 200 (current determinator) detects a short circuit in the detection target 1 while the current I having the determined current value I1 is being supplied to the detection target 1.

According to this configuration, the short circuit detection device 100 sets the upper limit current value Iu in advance, and when the upper limit current value Iu is equal to or greater than the current value I1 determined on the basis of the electrostatic capacitance value C, supplies the current I having the determined current value I1 to the detection target 1. On the other hand, when the upper limit current value Iu is lower than the current value I1 determined on the basis of the electrostatic capacitance value C, the short circuit detection device 100 limits the current I supplied to the detection target 1 to the upper limit current value Iu such that the current value I1 does not exceed the upper limit current value Iu.

With this configuration, since the current value of the current I is adjusted such that no excessive current flows in the detection target 1, it is possible to detect a short circuit in the detection target 1 while avoiding a situation where the detection target 1 is burned or broken.

The embodiments of the present invention described above merely illustrate a portion of the application examples of the present invention, and the technical scope of the present invention is not intended to be limited to the specific configurations of the embodiments described above.

In the above-described embodiments, the detection time T, the set current value Is, or the upper limit current value Iu is set in the processor 200 by the operation interface 220 provided in the short circuit detection device 100. However, the present embodiment is not limited thereto. For example, in a case where the detection time T, the set current value Is, or the upper limit current value Iu can be set in the processor 200 through wired communication or radio communication by a remote controller that is different from the short circuit detection device 100, the remote controller may be used as the operation interface 220.

In the above-described embodiments, the positive electrode (+) of the detection target 1 is connected to the connection terminal 101 of the short circuit detection device 100, and the negative electrode (−) of the detection target 1 is connected to the connection terminal 102 of the short circuit detection device 100. However, any electrode among the positive electrode (+) and the negative electrode (−) of the detection target 1 and an exterior casing constituting the detection target 1 may be respectively connected to the connection terminal 101 and the connection terminal 102 of the short circuit detection device 100.

In the above-described embodiments, a constant current is supplied to the detection target 1 to detect a short circuit by using a voltage between the two electrodes of the detection target 1 or a current flowing through the detection target 1. However, the present embodiment is not limited thereto. Various methods can be used to detect a short circuit, such as a method of detecting a short circuit by measuring a voltage drop after the detection target 1 is charged, or a method of detecting a short circuit from a change in current when a voltage is applied to the detection target 1.

In the above-described embodiment, the electrostatic capacitance value C of the detection target 1 is measured by applying an AC voltage to the detection target 1 and measuring a current flowing through the detection target 1. However, the present embodiment is not limited thereto. For example, the electrostatic capacitance value C may be measured by measuring a current when the detection target 1 is being discharged, by a method using an impedance bridge or a dip meter, by an integration method, or by a method of measuring the electrostatic capacitance value C from a vector of a current flowing through the detection target 1. Thus, the electrostatic capacitance value C can be measured by using various methods.

The present application claims priority based on JP 2021-098695 filed on Jun. 14, 2021 in Japan, and the present application claims priority based on JP 2022-095297 filed on Jun. 13, 2022 in Japan, the entire contents of which are incorporated by reference herein.

REFERENCE SIGNS LIST

1 Detection target
10 Current limiter
11 Constant current source (current supply circuit)
12 Constant voltage source
13, 21 Switch
20 Capacitance measurement power source (capacitance measurement circuit)
22 Capacitance-measuring current measurement circuit (capacitance measurement circuit)
120 Voltage measurement circuit
130 Current measurement circuit (detection circuit)
140, 240 Fluctuation detection circuit (detection circuit)
150 AD converter
200 Processor (current determinator)
230 Memory

The invention claimed is:

1. A short circuit detection device for detecting a short circuit occurring in a detection target, the short circuit detection device comprising:
a capacitance measurement circuit configured to measure an electrostatic capacitance value of the detection target;
a current determinator configured to determine a current value of a current to be supplied to the detection target, on the basis of the electrostatic capacitance value measured by the capacitance measurement circuit;
a current supply circuit configured to supply the current having the current value determined by the current determinator to the detection target; and
a detection circuit configured to detect a short circuit in the detection target while the current is being supplied to the detection target by the current supply circuit.

2. The short circuit detection device according to claim 1, comprising:
a memory configured to store in advance a detection time for detecting a short circuit in the detection target by the detection circuit, wherein
the current determinator determines the current value of the current to be supplied to the detection target, on the basis of the detection time stored in the memory and the electrostatic capacitance value measured by the capacitance measurement circuit.

3. The short circuit detection device according to claim 1, comprising:
a memory configured to store a set current value set in advance, wherein the current determinator
determines the current value of the current to be supplied to the detection target, on the basis of the set current value stored in the memory and the electrostatic capacitance value measured by the capacitance measurement circuit, and
when the set current value is equal to or less than the determined current value, detects a short circuit in the detection target while a current having the set current value is being supplied to the detection target.

4. The short circuit detection device according to claim 1, wherein
the current determinator increases the current value of the current supplied to the detection target as the electrostatic capacitance value increases, and decreases the current value of the current supplied to the detection target as the electrostatic capacitance value decreases.

5. The short circuit detection device according to claim 1, wherein
the current determinator controls the current supply circuit such that a value obtained by dividing the electrostatic capacitance value by the current value of the current supplied to the detection target is constant.

6. The short circuit detection device according to claim 1, comprising:
a memory configured to store in advance an upper limit current value indicating an upper limit of the current to be supplied to the detection target, wherein
the current determinator
determines the current value of the current to be supplied to the detection target, on the basis of the upper limit current value stored in the memory and the electrostatic capacitance value measured by the capacitance measurement circuit, and
when the determined current value exceeds the upper limit current value, detects a short circuit in the detection target while a current having the upper limit current value is being supplied to the detection target.

7. A short circuit detection method of detecting a short circuit occurring in a detection target, the short circuit detection method comprising:
measuring, by a capacitance measurement circuit, an electrostatic capacitance value of the detection target;
determining, by a current determinator, a current value of a current to be supplied to the detection target, on the basis of the electrostatic capacitance value measured by the capacitance measurement circuit;
supplying, by a current supply circuit, the current having the current value determined by the current determinator to the detection target; and
detecting, by a detection circuit, a short circuit in the detection target while the current is being supplied to the detection target by the current supply circuit.

* * * * *